(12) United States Patent
Mellor et al.

(10) Patent No.: US 10,495,272 B2
(45) Date of Patent: *Dec. 3, 2019

(54) ADJUSTABLE LIGHT EMITTING DIODGE LUMINAIRE DEVICE AND SYSTEM FOR CUSTOMIZED INSTALLATION

(71) Applicant: FINELITE INC., Union City, CA (US)

(72) Inventors: Jeffry Mellor, Union City, CA (US); Brian McIntyre, Oakland, CA (US); Stephen Zanoni, San Jose, CA (US); Aaron Matthew Smith, Fremont, CA (US); Marlon Ebido, San Leandro, CA (US); Cameron Black, Sacramento, CA (US); Walter Blue Clark, Palo Alto, CA (US); Johannes Dale Toale, San Jose, CA (US)

(73) Assignee: Finelite INC., Union City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/999,569

(22) Filed: Aug. 20, 2018

(65) Prior Publication Data

US 2019/0024856 A1 Jan. 24, 2019

Related U.S. Application Data

(63) Continuation of application No. 15/731,726, filed on Jul. 24, 2017, now Pat. No. 10,060,583, which is a (Continued)

(51) Int. Cl.
*H05B 37/00* (2006.01)
*F21S 4/20* (2016.01)
(Continued)

(52) U.S. Cl.
CPC ............... *F21S 4/20* (2016.01); *F21S 2/005* (2013.01); *F21S 4/28* (2016.01); *F21S 8/033* (2013.01);
(Continued)

(58) Field of Classification Search
CPC ............ H05B 33/0815; H05B 33/0818; H05B 41/2828; H05B 41/3921; H05B 41/3927;
(Continued)

(56) References Cited

U.S. PATENT DOCUMENTS 8,915,613 B2 * 12/2014 Clark ................. F21S 2/005
362/249.01
9,500,353 B2 * 11/2016 Clark ................. F21S 2/005
(Continued)

*Primary Examiner* — Minh D A
(74) *Attorney, Agent, or Firm* — James A. Gavney, Jr.; JAG Patent Services

(57) ABSTRACT

A lighting system is disclosed that includes elongated LED light fixture with one or more master circuit boards configured to power light emitting diodes. The elongated LED light fixtures include modular light boards with arrays of light emitting diodes that interchangeably couple to the matched connectors on the master circuit board. The system further includes elongated LED light fixtures with telescoping end features, fenestrated diffuser optics at ends of the elongated LED fight fixtures and/or pivoting corner features that join sections of the elongated LED light fixtures.

12 Claims, 11 Drawing Sheets

Related U.S. Application Data continuation-in-part of application No. 15/731,236, filed on May 8, 2017, now Pat. No. 9,807,845, which is a continuation-in-part of application No. 15/330,847, filed on Nov. 8, 2016, now Pat. No. 9,681,516, which is a continuation-in-part of application No. 14/544,020, filed on Nov. 14, 2014, now Pat. No. 9,500,353, which is a continuation-in-part of application No. 13/507,542, filed on Jul. 9, 2012, now Pat. No. 8,915,613.

(60) Provisional application No. 61/689,410, filed on Jun. 6, 2012, provisional application No. 62/494,469, filed on Aug. 10, 2016.

(51) Int. Cl.

| | |
|---|---|
| *F21S 2/00* | (2016.01) |
| *F21S 8/00* | (2006.01) |
| *F21S 8/04* | (2006.01) |
| *F21V 21/005* | (2006.01) |
| *H05B 33/08* | (2006.01) |
| *H05B 37/02* | (2006.01) |
| *F21V 15/01* | (2006.01) |
| *F21S 8/06* | (2006.01) |
| *F21S 4/28* | (2016.01) |
| *F21Y 103/10* | (2016.01) |
| *F21V 17/10* | (2006.01) |
| *F21V 23/02* | (2006.01) |
| *F21V 23/06* | (2006.01) |
| *F21Y 115/10* | (2016.01) |
| *F21V 5/00* | (2018.01) |
| *F21Y 105/16* | (2016.01) |
| *F21Y 113/13* | (2016.01) |

(52) U.S. Cl.
CPC .............. *F21S 8/046* (2013.01); *F21S 8/061* (2013.01); *F21S 8/066* (2013.01); *F21V 15/01* (2013.01); *F21V 15/012* (2013.01); *F21V 21/005* (2013.01); *H05B 33/0803* (2013.01); *H05B 33/0863* (2013.01); *H05B 33/0872* (2013.01); *H05B 37/0218* (2013.01); *H05B 37/0227* (2013.01); *H05B 37/0254* (2013.01); *H05B 37/0272* (2013.01); *F21V 5/007* (2013.01); *F21V 17/107* (2013.01); *F21V 23/02* (2013.01); *F21V 23/06* (2013.01); *F21Y 2103/10* (2016.08); *F21Y 2105/16* (2016.08); *F21Y 2113/13* (2016.08); *F21Y 2115/10* (2016.08); *Y02B 20/46* (2013.01)

(58) Field of Classification Search
CPC .. H05B 41/28; H05B 37/029; H05B 33/0803; H05B 37/0254; H05B 37/02; F21S 4/001; F21S 4/003; F21S 2/005; F21W 2121/00; F21W 2121/004; F21W 2131/103; F21Y 2101/02; F21K 9/00; F21V 29/004; F21V 15/01; F21V 21/30; F21V 14/02
See application file for complete search history.

(56) References Cited

U.S. PATENT DOCUMENTS

| | | | |
|---|---|---|---|
| 9,681,516 B2 * | 6/2017 | Clark | H05B 33/0863 |
| 9,807,845 B2 * | 10/2017 | Clark | F21S 8/033 |
| 10,060,583 B2 * | 8/2018 | Mellor | F21S 8/066 |

* cited by examiner

ADJUSTABLE LIGHT EMITTING DIODGE LUMINAIRE DEVICE AND SYSTEM FOR CUSTOMIZED INSTALLATION

RELATED APPLICATION

This application is a continuation application of U.S. patent application Ser. No. 15/731,726, filed Jul. 24, 2017, and titled, "ADJUSTABLE LIGHT EMITTING DIODE LUMINAIRE DEVICE AND SYSTEM FOR CUSTOMIZED INSTALLATION", which is a continuation-in-part of U.S. patent application Ser. No. 15/731,236, filed on May 8, 2017, and titled "LIGHT EMITTING DIODE LUMINAIRE DEVICE AND SYSTEM WITH COLOR TEMPERATURE TUNNING", now U.S. Pat. No. 9,807,845, which is a continuation-in-part of U.S. patent application Ser. No. 15/330,847, filed on Nov. 8, 2016, and titled "LIGHT EMITTING DIODE LUMINAIRE DEVICE AND SYSTEM WITH COLOR TEMPERATURE TUNNING", now U.S. Pat. No. 9,681,516, which is a continuation-in-part of U.S. patent application Ser. No. 14/544,020, filed on Nov. 14, 2014, and titled "LIGHT EMITTING DIODE LUMINAIRE DEVICE AND SYSTEM", now U.S. Pat. No. 9,500,353, which is a continuation-in-part of U.S. patent application Ser. No. 13/507,542, filed on Jul. 9, 2012, and titled "LIGHT EMITTING DIODE LUMINAIRE DEVICE AND SYSTEM", now U.S. Pat. No. 8,915,613, which claims priority under 35 U.S.C. § 119(e) from the U.S. provisional patent application Ser. No. 61/689,410, filed on Jun. 6, 2012, and titled "LUMINAIRE DEVICE AND SYSTEM." This Application also Claims priority under 35 U.S.C. § 119(e) from the U.S. provisional patent application Ser. No. 62/494,469, filed on Aug. 10, 2016, titled "ADJUSTABLE LED LIGHTING SYSTEM FOR CUSTOMIZED" INSTALLATION.

The U.S. patent application Ser. No. 15/731,726, filed Jul. 24, 2017, and titled, "ADJUSTABLE LIGHT EMITTING DIODE LUMINAIRE DEVICE AND SYSTEM FOR CUSTOMIZED INSTALLATION", U.S. Pat. No. 9,807,845, the U.S. Pat. No. 9,681,516, the U.S. Pat. No. 9,500,353, the U.S. Pat. No. 8,915,613, the U.S. provisional patent application Ser. No. 61/689,410 and the U.S. provisional patent application Ser. No. 62/494,469, are all hereby incorporated by reference.

FIELD OF THE INVENTION

This invention relates to lighting systems. More specifically, this invention relates to Light Emitting Diode (LED) devices and systems with features for customized installation.

BACKGROUND OF THE INVENTION

A light-emitting diode (LED) is a semiconductor diode that emits light when an electrical current is applied in the forward direction of the device, such as in a simple LED circuit.

The device is fabricated from layers of silicon and seeded with atoms of phosphorus, germanium, arsenic or other rare-earth elements. The layers of the device are called the die and the junction between the materials is where the light is generated. The electricity enters from one side of the die and exits out the other. As the current passes through the LED device, the materials that makes up the junction react and light is emitted.

LEDs are widely used as indicator lights on electronic devices and increasingly in higher power applications such as flashlights and area lighting. A LED is usually a small area (less than 1 mm$^2$) light source, often with optics added to the chip to shape its radiation pattern and assist in reflection. The color of the emitted light depends on the composition and condition of the semiconducting material used, and can be infrared, visible, or ultraviolet.

Combining red, green, and blue light-emitting diodes in the appropriate way allows lighting engineers to match the soft white light of incandescent bulbs. Also, combining red, green, and blue light-emitting diodes can be used to create other color light outputs or dynamic color light outputs for scores boards, advertisement boards and the like.

Because low cost white light emitting diodes are now available, blending or mixing of color LEDs for commercial or residential lighting application has largely been replaced with white light emitting diodes. White light emitting diodes are often characterized by a color temperature scale. The color temperature of any light source is the temperature of an ideal black-body radiator that radiates light of comparable hue to that of the light source. White light emitting LED's generally do not emit purely white light, but rather they emit a component of pure white light and varying amounts overtone colors. An LED color temperature defines the amount of pure white, yellow, red and blue emitted by the white light emitting diode. Another way to think of an LED color temperature is how 'warm' or 'cool' the light is that is emitted by white light emitting diode. A warmer white light emitting diode emits white light with overtone component of yellow or even red, while a cooler white light emitting diode emits white light with overtone components of blue.

LED-based light fixtures, such as described above, are often installed against walls, in and around corners, and against or near ceilings to provide direct, indirect, upward and/or downward lighting. This provides for a number of installation challenges that are addressed with the present invention.

SUMMARY OF THE INVENTION

The present invention is directed to a lighting device. The lighting device includes a first master circuit board with connectors configured to power light emitting diodes. The first master circuit board is coupled to a transformer for converting alternating current to direct current for powering the light emitting diodes. The lighting device further includes a first set of modular light boards with arrays of light emitting diodes. Preferably, the light emitting diodes used in the lighting device of the present invention each use 0.2 watts or less of electrical power. Also, preferably each of the modular light boards within the first set of modular light boards include an array of 20 or more light emitting diodes and upwards of 40 or more light emitting diodes.

The first set of modular light boards have matched connectors that detachably and interchangeably couple to the connectors on the first master circuit board. Accordingly, modular light boards are capable of being changed in the event that any one of the modular light boards fails or diodes on any one of the modular light boards fail. Also, modular light boards of the present invention can be added or removed according to the lighting needs of the environment where the lighting device is installed.

The lighting device also includes a housing for holding the first master circuit board and the first set of modular light boards. Preferably, the housing is an elongated housing with a first diffuser lens. The first master circuit board is positioned within the elongated housing, such that light emitted from the arrays of light emitting diodes on the first set of modular light boards is emitted through the first diffuser lens.

In further embodiment of the invention, the lighting device further comprising a second master circuit board with connectors configured to power light emitting diodes. The second master circuit board is configured to power and electrically couple to a second set of modular light boards having arrays of light emitting diodes, such as decided above with reference to the first master circuit board. In accordance with this embodiment of the invention the lighting device also includes a second diffuser lens coupled to the elongated housing and positioned on an opposed side of the elongated housing relative to the first diffuser lense. In operation, the second master circuit board is configured to emit light from the arrays of light emitting diodes on the second set of modular light boards through the second diffuser lense.

In yet further embodiments of the invention, the lighting device includes a controller for independently controlling light output from the first set of modular light boards and the second set of modular light boards. Alternatively, or in addition to the control feature described above, the lighting device is configured with a controller for selectively controlling light output from any of the arrays of light emitting diodes on any one of the modular light boards of the first master circuit and the second master circuit.

The interchangeable and modular features of the modular light boards allows for the construction of unique lighting systems that are either suspended from a ceiling or wall and/or that are integrated into a ceiling or wall. In accordance with the embodiments of the invention, the lighting device includes one or more mounting features or hardware for securing the lighting device to a wall or a ceiling. For example, the lighting device includes one or more cable features for mounting to a ceiling, one or more bracket features for mounting to a wall and/or adjustable or fixed flange features for mounting the lighting device recessed within a wall.

In accordance with the embodiments of the invention, the LED light system described above is equipped with an advanced control system and control interface that allows for dimming control and color temperature tuning. Control commands, operational protocols or communication networks in the LED lighting system utilize and number of standards, including Digital Signal Interface (DSI) 0-10 V lighting control signals and formats, Digital Addressable Lighting Interface (DALI) lighting control signals and formats, DMX512 (Digital Multiplex) control signals and formats or a combination thereof.

In accordance with the embodiments of the invention the system includes zones of LED light fixtures; each of the zones of LED light fixtures include one or more LED light fixtures. Each of the LED light fixtures within the system include different sets of LEDs that emit different output spectra that include a component of white light. In operation light emitted from two different sets of LED combine to produce a combined output light intensity and combined output light color temperature. By adjusting the relative intensities of light output from the different sets of LEDs within the light fixtures as well as the total combined intensity of the different sets of LEDs within the light fixtures, the light fixtures are capable of being adjusted to produce selected or target combined output light intensities and selected or target combined output light color temperatures. Preferably, each of the LED light fixtures include a set of LEDs that emit a component of yellow light as well as a component of white light (warm white light) and a different set of LEDs that emit a component of blue light as well as well as a component of white light (cool white light).

The system includes a control unit coupled to the LED light fixtures for controlling power to the LED light fixtures based on control command signals provides from any number of sensors, switches and control interface devices. The sensors preferably include daylight sensors that measure or detect an amount of ambient light, and/or color of ambient light. The daylight sensors provide control signals to the control unit to maintain a target combined output light intensity and the target combined output light color temperature resulting from the combination of light emitted by the light fixtures and light provided from ambient light. Where the sensors include a white light sensor, they system adjusts the total output intensity of the LED light fixtures as wells as the relative intensities of different LEDs within the LED light fixtures to compensate for the presence of white light provided by ambient light. Other sensors include occupancy sensors that adjust light outputs from the LED light fixtures based on presence or people within a vicinity of the LED light fixtures or vicinity of the occupancy sensors.

The control unit include all the necessary electrically components, including a computing unit (CPU) for running software and analyzing control signals received from sensors and control interface devices and connectors for coupling to and for powering the LED light fixtures. In accordance with the embodiments of the invention the control unit includes a wireless transmitter for receiving and processing input control signals from a remote control interface device, such as a smart-phone or computer.

In accordance with the embodiments of the invention a control interface device is a blue-tooth enabled device that has a touch-screen. The control interface device pairs with a blue-tooth transducer coupled to the control unit. The control interface device runs software that generates one or more selectable graphical control interfaces that allows a user to input selected or target output light intensities and selected or target output light color temperatures. Preferably, one of the graphical control interfaces includes movable intersecting cross-hairs. In operation, a user drags or moves positions of the intersecting cross-hairs on the touch-screen of the control interface device to change or adjust the output light intensity and output light color temperature of the LED light fixtures.

In accordance with the method of the invention white light is generated by emitting light from different sets of LEDs of one or more light fixtures that emit different output spectra and that include a component of white light. As described above, the output spectra from the different LEDs combine to produce a combined output light intensity and a combined output light color temperature. In operation a target combined output light intensity and a target combined output light color temperature are selected through a graphical control interface on a control interface device. The control interface device then sends control signals or control commands to the CUP of the control unit and the control unit adjusting the relative intensities and the total combined intensities of light from the different sets of LEDs to reach the selected output light intensity and selected output light color temperature. Preferably, an amount of ambient light is measured or detected using one or more sensors and the control unit compensates or adjusts the output light intensities and the target output light color temperature to include or compensate for the amount of ambient light measure or detected.

The aforementioned light fixtures, with or without the color temperature tuning control systems, are often designed to be installed against walls, in and around corners, and against or near ceilings. One of the problems that occurs during installation and manufacturing of elongated LED light fixtures, is that to make or install the elongated LED light fixtures the full length of a wall, the light fixtures must be customized to be the exact length of that wall. To address this afore mentioned shortcoming and to allow for a degree of wall length variability, the elongated LED light fixtures of the present invention have telescoping end features. The telescoping end features allow the same elongated LED light fixtures to be installed against walls with varying degrees of length while still covering the entire length of the wall.

A second problem that occurs when elongated LED light features are installed along walls and through joining corners of the walls is that the elongated LED light fixtures tend to cast or emit inconsistent lighting along the walls near the jointing corners of the walls. The joining corners often appear to have cross-over shadowing or have search lighting effects. To provide uniform and continuous light on walls and through the joining corner regions of the walls, the elongated LED light fixtures of the present invention have diffuser optics in front on LED arrays at or near corner ends of the elongated LED light fixtures. The diffuser optics "soften" the blending of light at the corner regions and decreases or eliminates the cross-over shadowing and/or search lighting effects often observed at or near the joining corners along the walls where these elongated LED light fixtures are installed.

A third problem that occurs during installation of elongated LED light fixtures continuously along walls and through jointing corners of the walls is that the joining corners of the walls have varying angles. While jointing corners of walls ideally have an angle of 90 degrees between the walls, the joining corners often vary between 85 and 95 degree between the walls. To address this aforementioned shortcoming and to allow elongated LED light fixtures to be installed along walls and through joining corners with varying angles between the walls, the elongated LED light fixture of the present invention have pivoting corner features that join sections of the elongated LED light fixtures together. The pivoting corner features allow the elongated LED light fixtures of the present invention to be installed continuously and seamlessly through joining corners between walls with varying degrees of separation while still fitting firmly against the walls and through the joining corner.

DETAILED DESCRIPTION OF THE INVENTION

Figure 1A:
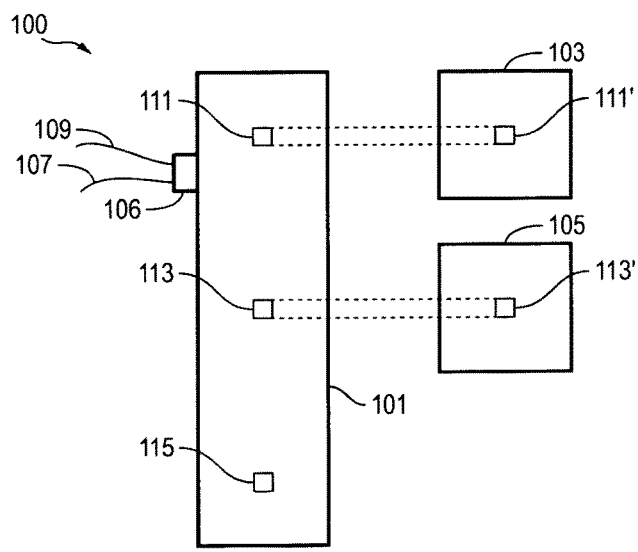
FIG. 1A is a schematic representation of a master circuit board with modular light boards having matched connectors that detachably and interchangeably couple to the connectors on the master circuit board, in accordance with the embodiments of the invention.

FIG. 1A is a schematic representation 100 of a master circuit board 101 with modular light boards 103 and 105 that have matched connectors 111' and 113' that detachably and interchangeably couple to the connectors 111, 113, 115 on the master circuit board 101. The master circuit board 101 includes, or is electrically coupled to, a transformer 106 for converting alternating current from power leads 107 and 109 into direct current for powering light emitting diodes. The master circuit board 101 along with modular light boards 103 and 105 are used in a lighting device such as described in detail below.

Figure 1B:
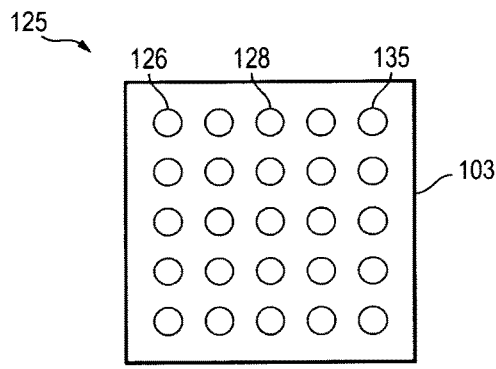
FIG. 1B shows of an array of light emitting diodes on a modular light board that electrically couples to the master circuit board, in accordance with the embodiments of the invention.

FIG. 1B shows a schematic representation 125 of an array of light emitting diodes 126, 128 and 135 on a modular light board 103 that electrically couples to a master circuit board 101 (FIG. 1A). Each of the modular light boards 103 and 105 in the lighting device of the present invention include arrays of light emitting diodes with 20 or more discrete light emitting diodes and upwards of 40 or more discrete light emitting diodes. Preferably, the discrete light emitting diodes used in the lighting device of the present invention each use 0.2 watts or less of electrical power.

The modular light boards 103 and 105 of the lighting device are capable of being individually changed in the event that any one of the modular light boards 103 and 105 fails or diodes on any one of the modular light boards 103 and 105 fails. A lighting device or lighting system of the present invention includes any number of modular light boards and modular light boards can be added or removed according to lighting needs of the environment where the lighting device is installed. Modular light boards 103 and 105 have multiple LED arrays having different corresponding color spectra and/or the modular light boards 103 and 105 each have LED arrays having different corresponding color spectra, such that the color temperature of light emitted can be controlled, such as described in detail below.

Figure 1C:
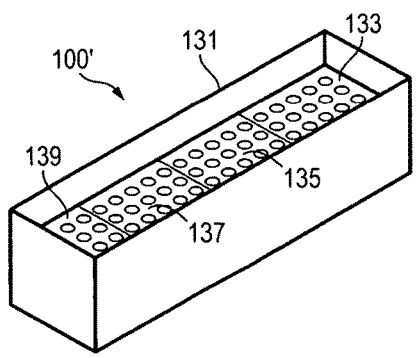
FIG. 1C shows a perspective view of a lighting device with an elongated housing, in accordance with the embodiments of the invention.

FIG. 1C shows a perspective view of a lighting device 100' with an elongated housing 131, in accordance with the embodiments of the invention. The elongated housing 131 is configured for holding one or more master circuit boards each with any number of modular light boards 133, 135, 137 and 139 with each of the modular light boards having arrays of light emitting diodes, such as described above. Preferably, the elongated housing 131 has a diffuser lens (not shown) that is positioned in front of the arrays of light emitting diodes or modular light boards 133, 135, 137 and 139 for diffusing light emitted therefrom.

Figure 1D:
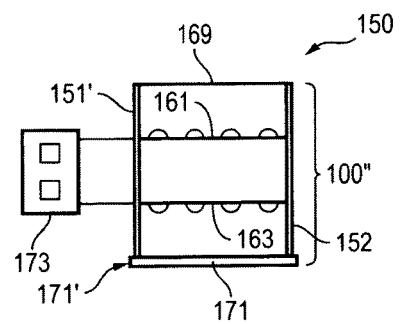
FIG. 1D shows a cross-sectional view of a lighting device with stacked arrays of light emitting diodes for emitting light through opposed sides of a housing structure, in accordance with the embodiments of the invention.

FIG. 1D shows a cross-sectional view 150 of a lighting device 100" with stacked arrays of light emitting diodes 161 and 163 for emitting light through opposed sides of a housing structure 151'. The stacked arrays of light emitting diodes 161 and 163 are positioned on any number of modular light boards that are electrically coupled to a respective master circuit through matched connectors, such as described above with reference to FIG. 1A. Each of the master circuit board is electrically coupled to a transformer and any other necessary circuitry for powering the stacked arrays of light emitting diodes 161 and 163 from an alternating current power source (not shown).

Still referring to FIG. 1D, in accordance with the embodiments of the invention the lighting device 100" includes a controller 173. The controller 173 allows for independently controlling light output from each master circuit board, from each modular light boards and/or from each of the stacked arrays of light emitting diodes 161 and 163. The controller includes the appropriate circuitry for executing communication protocols that allow the color temperature of the light output to be adjusted through a user interface, such as described with reference to FIGS. 2A-B.

Preferably, the lighting device 100" includes diffuser lenses 169 and 171 positioned in front of each of the stacked array of light emitting diodes 161 and 163, respectively. In accordance with further embodiments of the invention one of the diffuser lens 171, or both of the diffuser lenses 169 and 171 extends along a wall portion 152 of the housing 151', such that soft-wash lighting emits from side surfaces 171' of the diffuser lens 171 with the array of light emitting diodes 163 powered on.

Figure 1E:
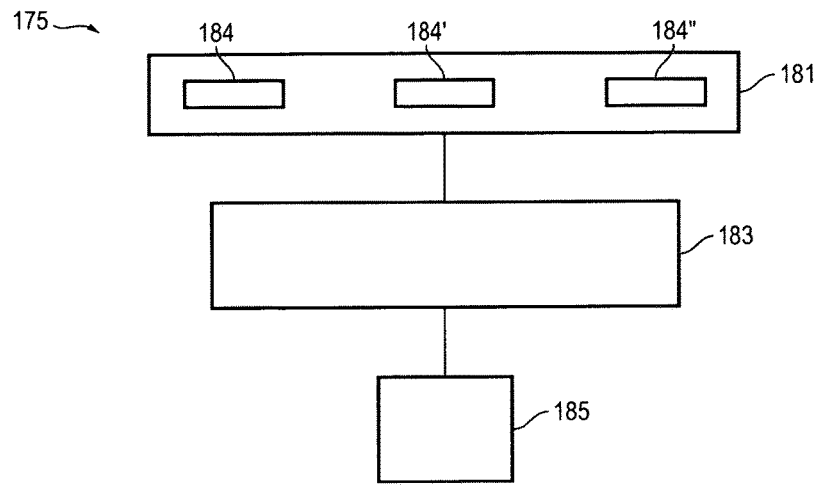
FIG. 1E is a schematic representation of an advanced control lighting system, in accordance with the embodiments of the invention.

Referring to FIG. 1E, a lighting system 175 of the present invention includes an advanced control interface. For example, the lighting system 175 includes light fixture 181 with multiple LED arrays 184, 184' and 184" having different corresponding color spectra $C_1$, $C_2$ and $C_3$. As described above, each of the multiple LED arrays 184, 184' and 184" can include combinations of LEDs having different color spectra $C_1$, $C_2$ and $C_3$. However, for simplicity of explaining operation of the advanced control interface, the LED arrays 184, 184' and 184" are described herein as having a single but different corresponding color spectra $C_1$, $C_2$ and $C_3$. The LED arrays 184, 184' and 184" are mounted on modular light boards that have matched connectors that detachably and interchangeably couple to the connectors on the master circuit board, such as described with reference to FIG. 1A. Also, the LED arrays 184, 184' and 184" can be mounted to provide upward and downward lighting and can include controls for independent upward and downward dimming, such as described above with reference to FIG. 1D.

Preferably each of the LED arrays 184, 184' and 184" emit a component of white light with a component of red, yellow or blue. In other words, the multiple LED arrays 184, 184' and 184" are formed form white LEDs that emit light with varying amounts of cool (higher color temperature) and warm (lower color temperature) white light.

The system also includes a control unit 183 in electrical communication with the light fixture 101. The control unit 183 is configured to independently control the light output intensities $I_1$, $I_2$ and $I_3$ of each of the of the LED arrays 184, 184' and 184", such that light emitted from the LED arrays 184, 184' and 184" combine to give a total light output intensity $I_T$. By varying the relative amounts or percentages of light output light intensities $I_1$, $I_2$ and $I_3$ emitted from each of the LED arrays 184, 184' and 184", the color spectra $C_1$, $C_2$ and $C_3$ combine to produce a total color temperature $C_T$ of the output light emitted by the light fixture 181 is varied. By maintaining relative amounts or percentages of output light $I_1$, $I_2$ and $I_3$ emitted from each of the LED arrays and simultaneously decreasing or increasing the light output light intensities $I_1$, $I_2$ and $I_3$, the total output light intensity $I_T$ emitted from the light fixture is decrease or increased.

The system 175 includes a user interface 185, also referred to herein as a control interface device. The control interface device 185 is either a mechanical control interface device, a touch screen control interface device, a remote wireless control interface device, or a combination thereof. Regardless, the control interface device 185 allows a user to adjust, manipulate, or select both the combined output light intensity from LED arrays 184, 184' and 184" (by changing $I_T$) and the combine output light color temperature from LED arrays 184, 184' and 184" (by changing the relative percentages of $I_1$, $I_2$ and $I_3$ that contribute to $I_T$).

Figure 2A:
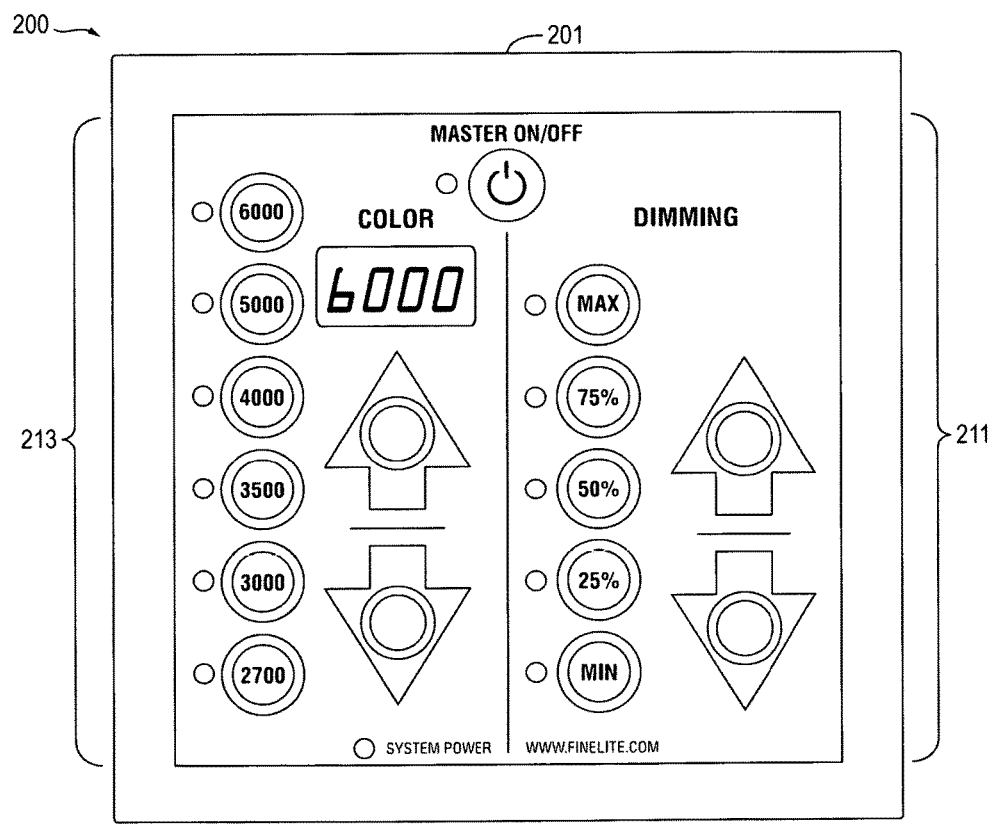
FIG. 2A shows a view of a control interface device for controlling output lighting from an advanced control lighting system, in accordance with the embodiments of the invention.

FIG. 2A shows a view 200 of a control interface device 201 for controlling output lighting from an advanced control lighting system, in accordance with the embodiments of the invention. The control interface device 201 is divided into two control zones 211 and 213. In the control zone 211, a user can select a total light output intensity $I_T$ from a set of LED light fixtures within the lighting system, that include LED fixtures similar to the LED light fixture 181 described with reference to FIG. 1E. The total light output intensity $I_T$ is selected by touching a set buttons or by toggling up or down using arrows within the control zone 211. In the control zone 213, a user can select a total color temperature $C_T$ from a set of LED light fixtures within the lighting system, that include LED fixtures similar to the LED light fixture 181 described with reference to FIG. 1E. The total color temperature $C_T$ is selected by touching a set buttons or by toggling up or down using arrows within the control zone 213. The control interface device 201 is portable, or mounted to a wall and preferably includes a master on and off switch for turning on and off a set or sets of LED light fixtures within the lighting system that are assigned to the control interface device 201.

Figure 2B:
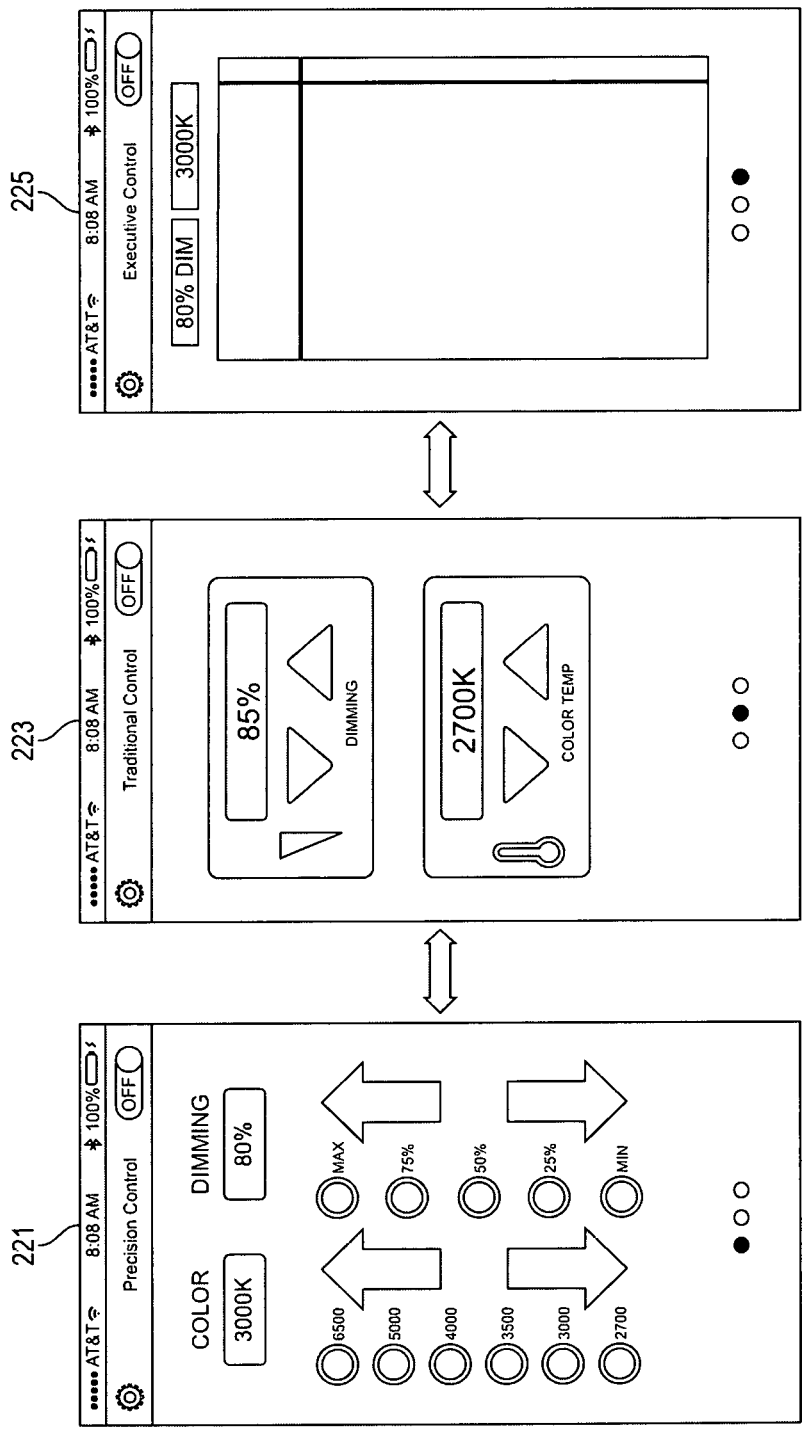
FIG. 2B shows selectable graphical control interfaces operable from a remote control interface device for controlling output lighting from an advanced control lighting system, in accordance with the embodiments of the invention.

Referring to FIG. 2B, in accordance with the embodiments of the invention a control interface device is a Bluetooth enabled control interface device that has a touch screen, such as a smart-phone or a computer. In operation, the Bluetooth enabled control interface device "pairs" with a Bluetooth transducer coupled to the control unit 183 (FIG. 1E). The Bluetooth enabled control interface device runs software that generates one or more selectable graphical control interfaces 221, 223 and 225, such as shown in FIG. 2B. The graphical control interfaces 221, 223 and 225 allow a user to select or input target output light intensities and select or input target output light color temperatures. The graphical control interfaces 221 and 223 are both divided into two control zones, 221 being divided into two vertical control zones and 223 being divided in two horizontal control zones. As described above with reference to FIG. 2A, graphical control interfaces 221 and 223 include one control zone for selecting or adjusting a total light output $I_T$ from a set of light fixtures within the lighting system and one control zone for selecting or adjusting a total color temperature $C_T$ from the set of light fixtures within the lighting system.

Preferably, one of the selectable graphical control interfaces 225 includes movable intersecting cross-hairs. In operation, a user drags or moves positions of the intersecting cross-hairs on the touch screen of the Bluetooth enabled control interface device to select a total light output $I_T$ from the set of light fixtures within the lighting system and a total color temperature $C_T$ from the set of light fixtures within the lighting system either individually or simultaneously.

Figure 2C:
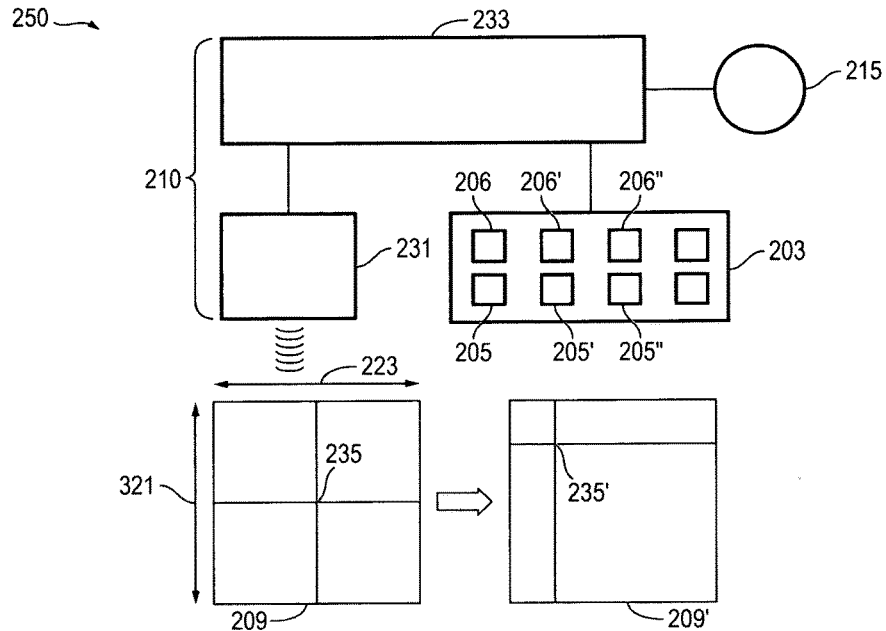
FIG. 2C shows a schematic representation of an advanced control lighting system with a wireless transducer for receiving and processing input control command signals from a remote control interface device, in accordance with the embodiments of the invention.

FIG. 2C shows a schematic representation 250 of an advanced control lighting system 210 with a wireless transducer 210 for receiving and processing input control signals from a remote control interface control device and/or transmitting system status signals to the a remote control interface device (not shown), such as a smart-phone or a computer. The system 210 includes a set of LED light fixtures. Each of the LED light fixtures within the set of LED light fixtures 201 includes at least two different sets of LEDs 205/206, 205'/206' and 205"/206" that emit different output spectra. The LEDs 205/206, 2057206' and 205"/206" are mounted on modular light boards that have matched connectors that detachably and interchangeably couple to the connectors on the master circuit board, such as described with reference to FIG. 1A. Also, the LEDs 205/206, 205'/206' and 205"/206" can be mounted to provide upward and downward lighting and can include controls for independent upward and downward dimming, such as described above with reference to FIG. 1D The system further includes a control unit 233. The control unit 233 includes all the necessary electrically components, including one or more computing units (CPUs) for running software and analyzing control signals received from sensors 215 and control interface devices and connectors for coupling to and for powering the set of LED light fixtures 203. The sensors 215 can include any number of sensors including but not limited to light sensors for measuring ambient light and/or measuring and calibrating light outputs from the set of light fixtures 203 and motion or occupancy sensors. Preferably, at one of the sensors 215 is used to measure and calibrate light outputs from set of light fixtures 203 such that a selected or target output light intensity and selected or target output light color temperature is maintained. In operation the light sensor measures white light from ambient light. The light sensor send the appropriate control command signals to control unit 213 and the control unit 213 adjusts the total output intensity of from the set of LED light fixtures 203 as wells as the relative intensities of different LEDs 205/206, 205'/206' and 205"/206" within the set LED light fixtures 203 to compensate for white light provided by the ambient light.

Still referring to FIG. 2C, in a preferred embodiment of the invention the lighting system 210 includes a Bluetooth transmitter 231 that allows a user to "pair" a Bluetooth enabled wireless remote control interface device, such as a smart-phone or computer, with the lighting system 210. Preferably, the Bluetooth enabled wireless remote control interface device includes a touch screen and is capable of running application software to display a graphical control interface (FIG. 2B) that includes movable and intersecting cross-hairs, such as described above. The axis 321 on the graphical control interface 225 (FIG. 2B) can, for example, represent output light intensity and the axis 223 on the graphical control interface 225 (FIG. 2B) can, for example, represent output light color temperature. By moving the cross-hairs to different locations 235 and 235' within the frame of touch screen of the blue-tooth enabled wireless remote control interface device, the light outputs from the set of light fixtures 203 are adjusted to new output light intensities and new output light color temperatures. For example, the graphical representation 209' corresponds to a lower light output intensity and cooler output light color that the corresponding to the graphical representation 209.

Figure 3A:
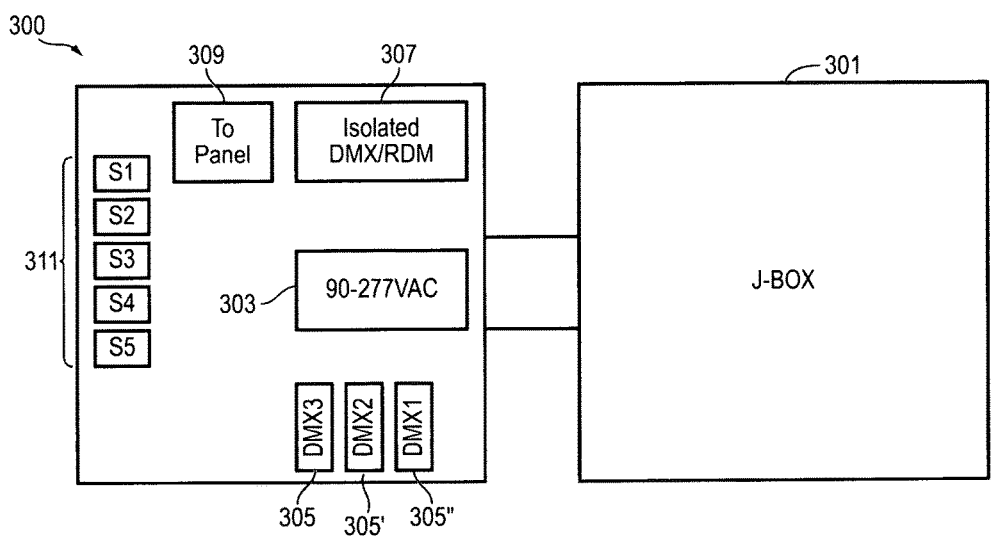
FIG. 3A shows schematic representation of a power control center for powering an advanced control lighting system of the present invention.
Figure 3B:
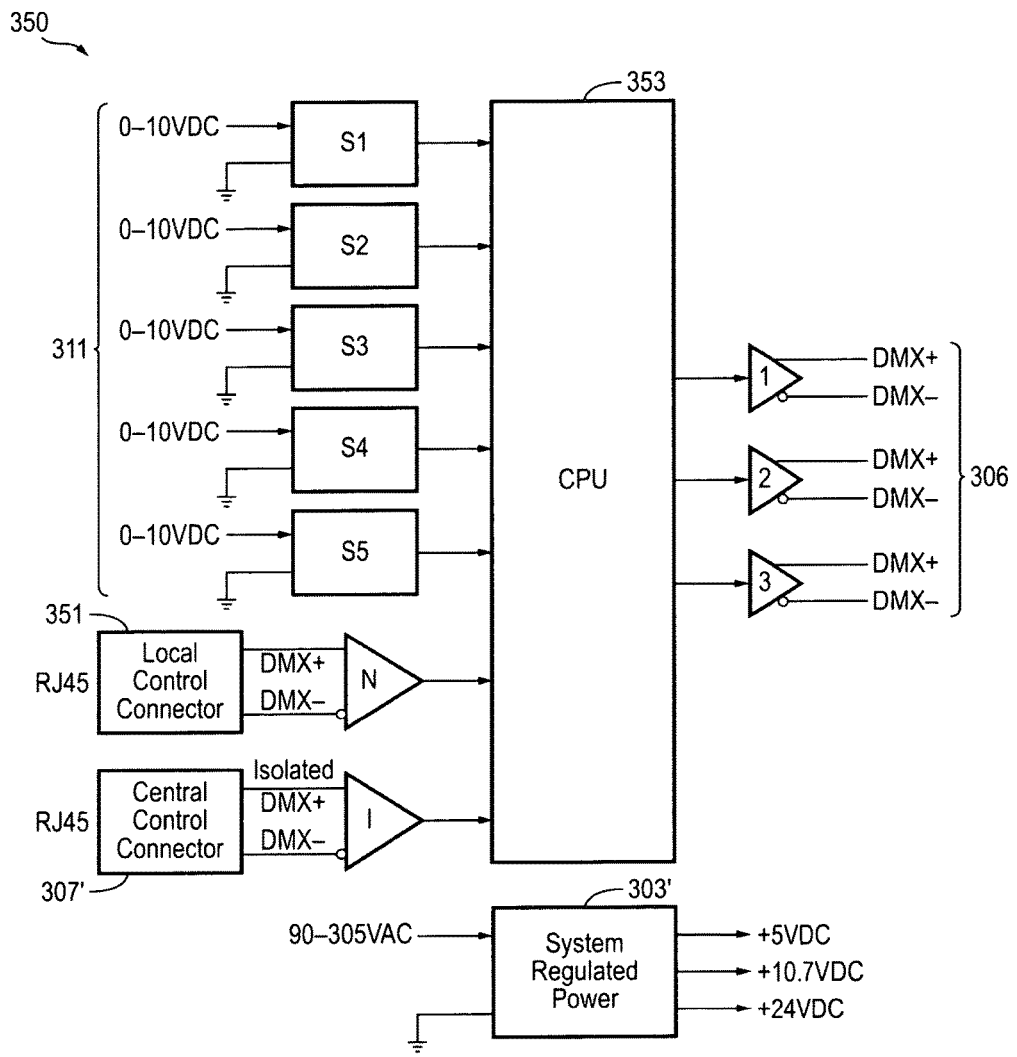
FIG. 3B shows a schematic representation of signals control center for controlling an advanced control lighting system of the present invention.

Referring now to FIG. 3A showing a power control center 300 and FIG. 3B showing a signal control center 350 for powering and controlling the advanced control lighting system of the present invention. The power control center 300 includes a junction box 301 that provides power to a power supply 303. The power control center 300 includes a panel 309 that powers a local control connector 351 of the signal control center 350 and an isolated DMX/RMX 307 that powers a central control connector 307') of the signal control center 350 through a regulated power source 303'. The power control center 300 also provides power for a set of sensors 311 in communication with a control center CPU 353 of the signals control center 350. The power control center 300 also provided power to a set master DMX output connectors 306 through DMX connectors 305, 305' and 305" and the regulated power source 303'.

In operation, the signal control center CPU 353 receives control command signals from the local control connector 351, the central control connector 307' and the set of sensors 311. Based on the control command signals the signal control center CPU will adjust the output signals to the set master DMX output connectors 306 that control LED light fixtures in the system of the present invention.

Figure 4:
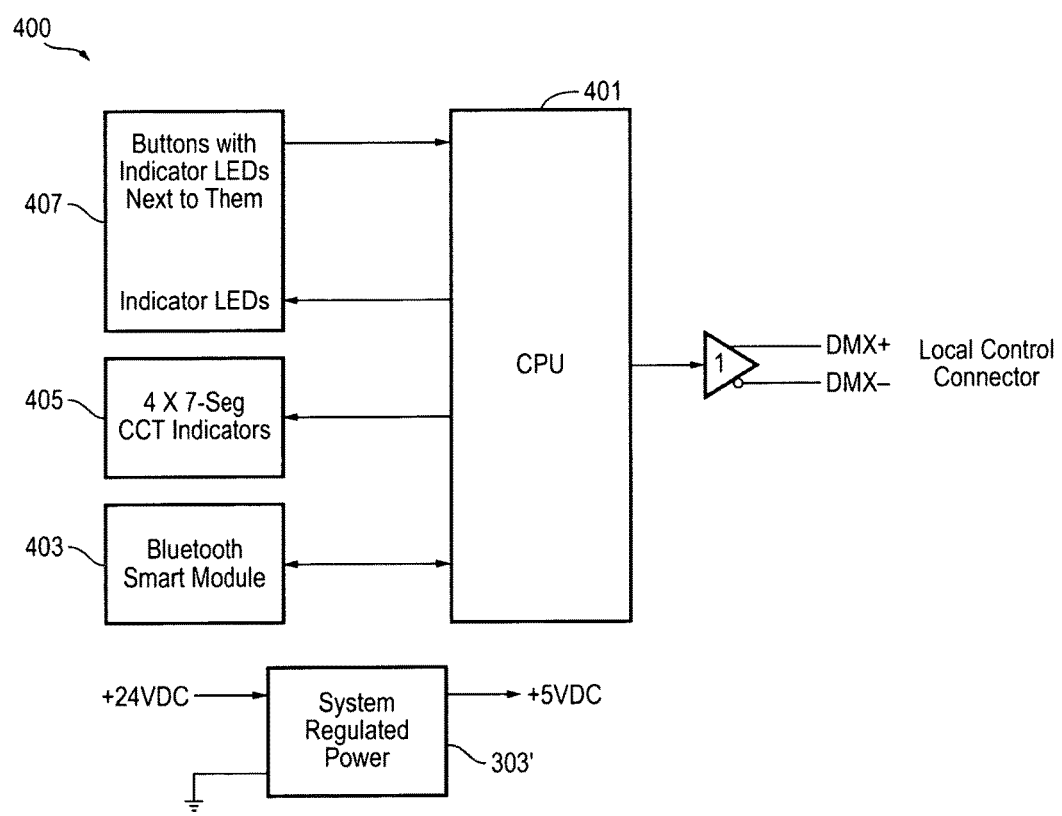
FIG. 4 shows a schematic representation of a user control interface for inputting control command signals and controlling an advanced control lighting system, in accordance with the embodiments of the invention.

FIG. 4 shows a schematic representation of a user control interface 400 powered by a regulated power source 303' and configured for controlling the advanced control lighting system, in accordance with the embodiments of the invention. The user control interface 400 can include an control interface 407 that is coupled to an control interface device 185 (FIG. 1E). The control interface includes button or switch contacts for selecting output light intensities and selecting output light color temperatures, such as described above. The control interface 400 can also include LED indicators to show values of output light intensities and output light color temperatures that have been selected through the buttons or switches of a control interface device 185 (FIG. 1E). The user control interface 400 also includes indicators 405, such as color corrected temperature indicators, that provide an indication of a status of the LED light fixtures within the system that are assigned to the user control interface 400. The user control interface 400 also preferably includes a bluetooth module 403 that allows advanced control lighting system to be control by bluetooth enabled wireless remote control device, such as described with reference to FIG. 2C above and FIG. 5 below. In operation, control command signals are input through the user control interface 400 from the control interface 407, via control interface device 105, or the bluetooth module 403, via bluetooth enabled wireless remote control device. The control command signals are processed by a control interface CPU 401 and an output control signals are transmitted to the local control connector 351 (FIG. 3B) and LED light fixtures assigned to the user control interface 400 are adjusted according to the control command signals through the signal control center CPU 353 and the set master DMX output connectors 306 (FIG. 3B)

Figure 5:
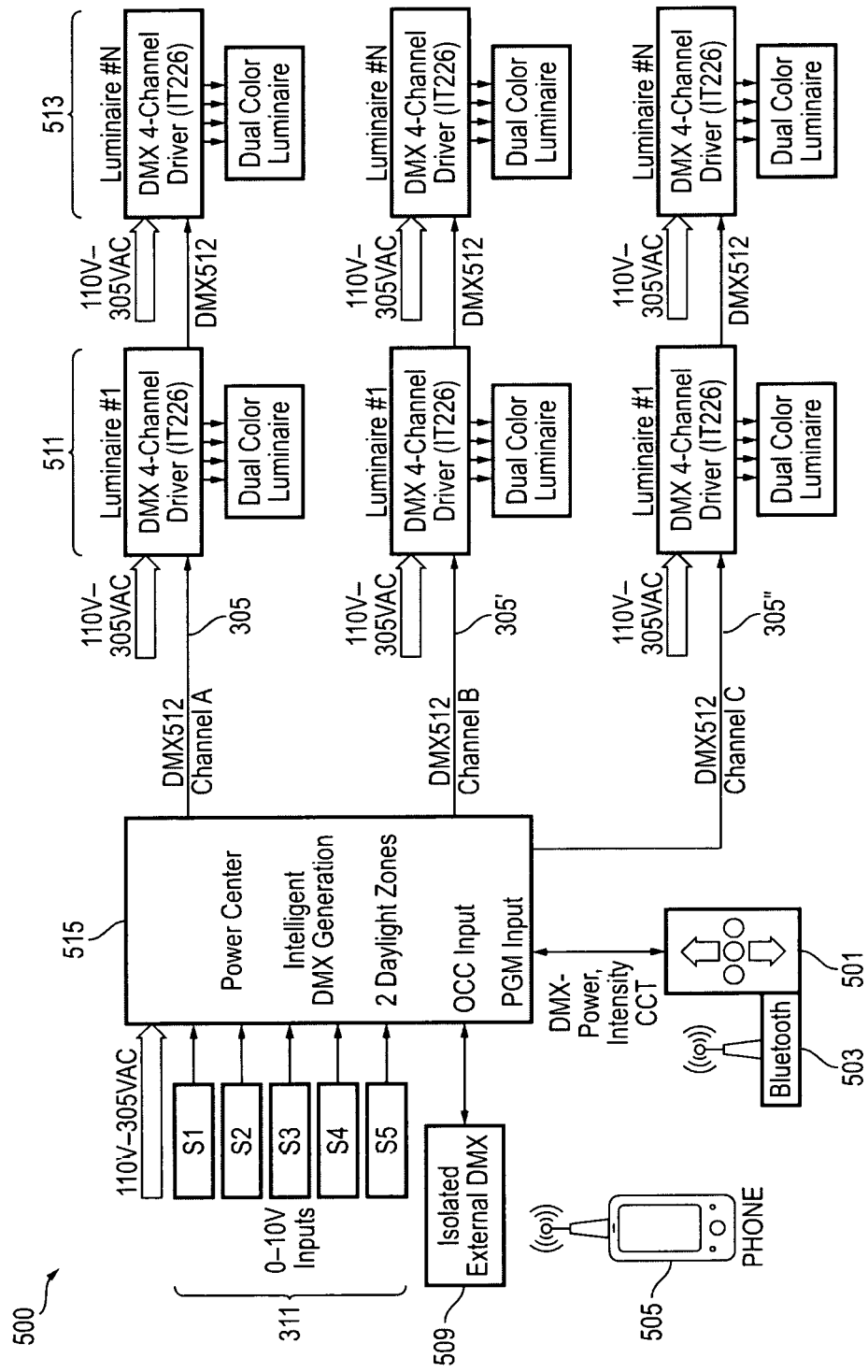
FIG. 5 shows a schematic representation of an advanced control lighting system in accordance with a preferred embodiment of the invention.

FIG. 5 shows a schematic representation of an advanced control lighting system 500 in accordance with a preferred embodiment of the invention. The system in sets of LED light fixtures 513 and 513 connected to three master DMX output connectors 305, 305' and 305" (Channel A, Channel B and Channel C). Each of the LED light fixtures in the sets LED light fixtures 511 and 513 are dual color luminaires (meaning each have two sets of different white LEDs). The system includes a master control center 515 with sensors 311, a power control center 300 (FIG. 3A), the signal control center 350 (FIG. 3B) and user control interface 400 (FIG. 4) and an isolated eternal DMX 509. Other features and specifications of the advanced control lighting system 500, the master control center 515, the connections 305, 305' and 305" and the LED light fixtures 511 and 513 are provided in the co-pending U.S. provisional patent applications Ser. Nos. 62/122,621, 62/178,705 and 62/230,798 that are all incorporated herein by reference.

As described above, the master control center 515 preferably includes a Bluetooth module 503. The Bluetooth module 503 allows a Bluetooth enabled wireless remote control device 505, such a smart-phone, to provide control command signals to the system and control the sets of LED light fixtures 511 and 513 through one or more graphical control interfaces 501. Preferably, a user can selectively control output signals provided through connectors 305, 305' and 305" corresponding (Channel A, Channel B and Channel C) individually or independently.

Figure 6:
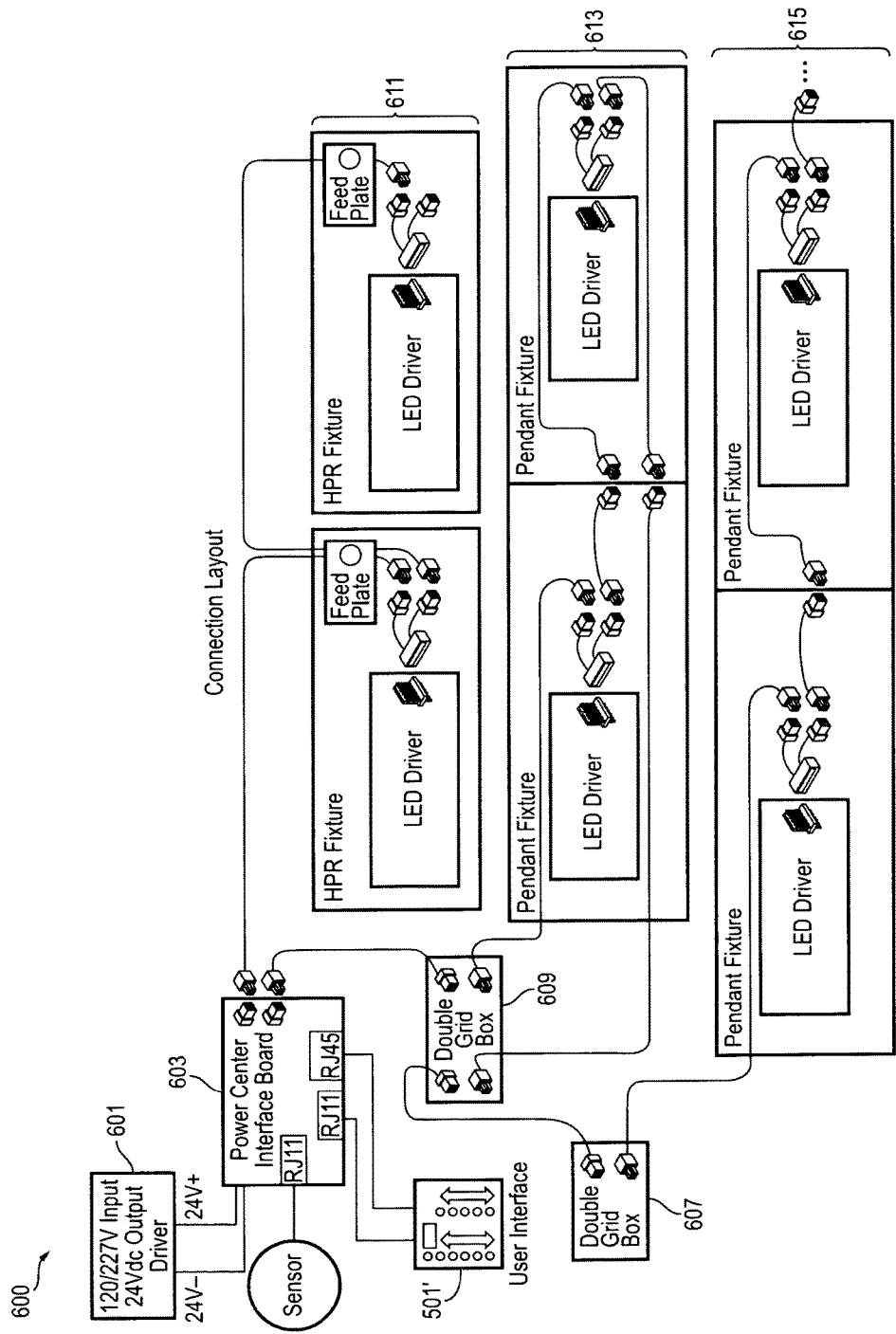
FIG. 6 shows a schematic representation of a connection layout for an advanced control lighting system of the present invention.

FIG. 6 shows a schematic representation of a connection layout for the advanced control lighting system 600 of the present invention. In the system 600, sensors and a user interface 501' are electrically couple to a power center interface board 603 through RJ11 and RJ45 plugs. The Power center interface board 603 is electrically coupled to and input/output driver circuit 601. The sets of LED light fixtures 611, 613 and 615 are coupled to the power interface board 603 through double grid boxes 607 and 609. Preferably, the advanced control lighting system 600 is connected and assembled through two-part plug connectors, as shown, such that installing the system and maintaining the system 600 requires a minimized effort. Each of the LED light fixtures 611, 613 and 615 include LED arrays having different two or more corresponding color spectra $C_1$, $C_2$ and $C_3$. The LED arrays are mounted on modular light boards that have matched connectors that detachably and interchangeably couple to the connectors on the master circuit board, such as described with reference to FIG. 1A. Also, the LED arrays can be mounted in light fixtures, such as described with reference to FIG. 1D, to provide upward and downward lighting and can include controls for independent upward and downward dimming control.

Figure 7:
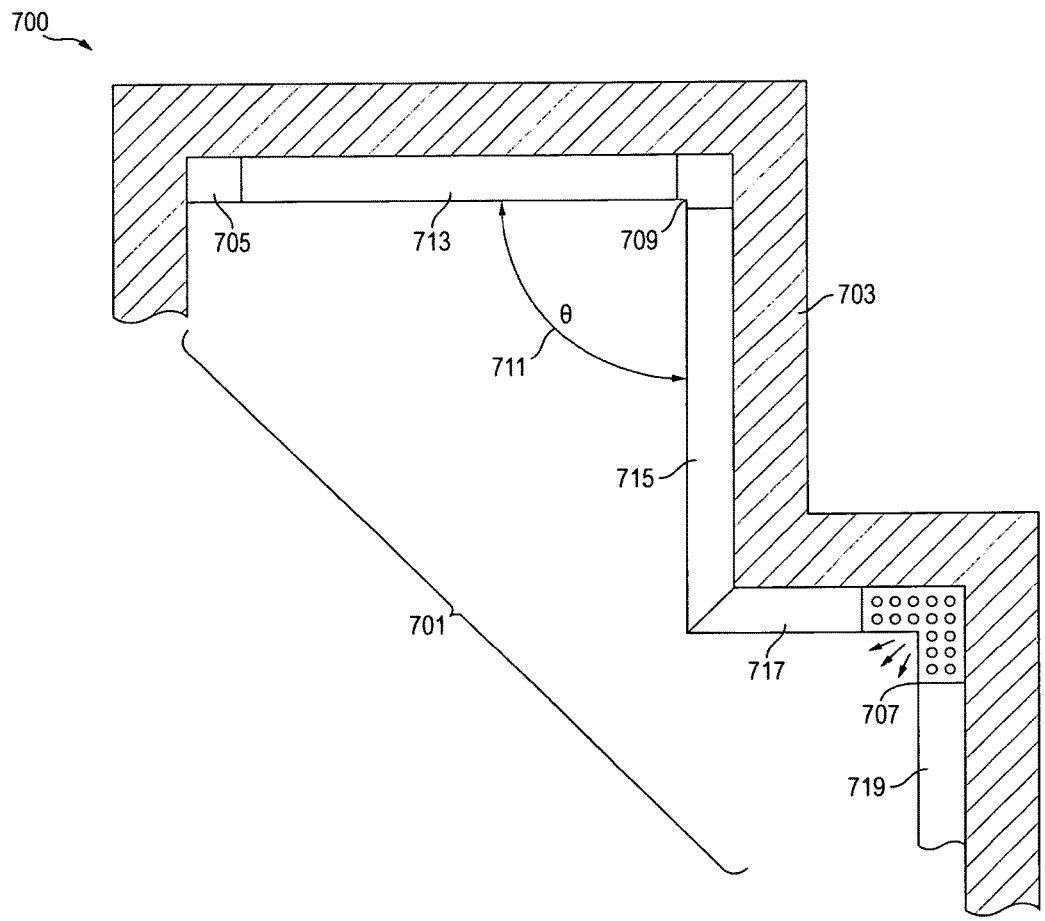
FIG. 7 shows a schematic representation of an installation layout for elongated LED light fixtures installed along walls and through joining corners of the walls, in accordance with the embodiments of the present invention.

FIG. 7 shows a schematic representation 700 of an installation layout 701 for elongated LED light fixtures 713, 715, 717 and 719 installed along walls 703 and through joining corners of walls, in accordance with the embodiments of the present invention. The elongated LED light fixtures 713, 715, 717 and 719 are elongated light futures with the features and elements described above with reference to FIGS. 1A-E and with or without the color control system described above with reference to FIGS. 2A-C.

The installation layout 701 preferably includes one or more elongated LED light fixtures 713 with telescoping end features 705, one or more diffuser optics 707 attached to joining corner ends of the elongated LED light fixtures 717 and 719 and one or more pivoting corner features 709 attached to joining corner ends of elongated LED light fixtures 713 and 715. The telescoping features 705, the diffuser optics 707 and the pivoting corner features 709 are described in detail below with reference to FIGS. 8, 9 and 10A-D.

Figure 8:
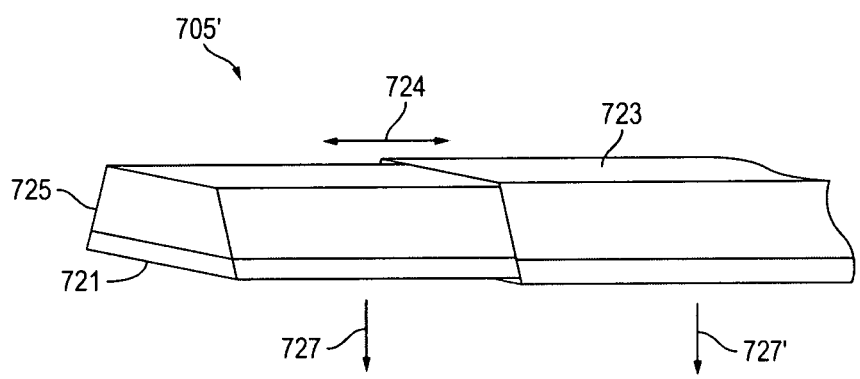
FIG. 8 shows a schematic representation of a portion of an elongated LED light fixture with a telescoping end feature, in accordance with the embodiments of the present invention.

FIG. 8 shows a schematic representation 705' of a portion of an elongated LED light fixture 723 with a telescoping end feature 724. The telescoping end feature 724 allows the portion of the LED light fixture 723 to adjust to have different lengths, as indicated by the arrow 724. The portion of the elongated LED light fixture can include any number of different optical features 721 to provide diffuse direct or indirect downward lighting, as indicated by the arrows 727 and 727'. While the portion of the elongated LED light fixture 723 is shown to provide downward lighting for illustrative purpose, the portion of the elongated LED light fixture 723 can also provide upward direct or indirect lighting. Regardless of weather the portion of the elongated LED light fixture 725 provides downward lighting, upward lighting or both, the telescoping end feature 725 allows the same elongated LED light fixtures to be installed against walls 703 (FIG. 7) with varying degrees of length while still covering the entire length of the wall.

Figure 9:
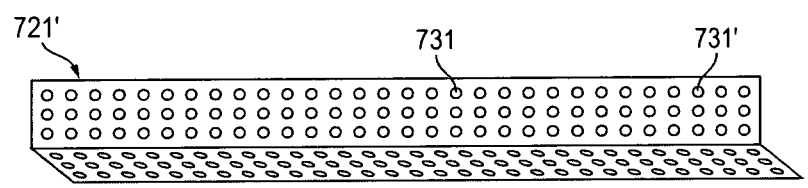
FIG. 9 shows a schematic representation of diffuser optics installed on end portions of elongated LED light fixtures to reduce or eliminate cross-over shadowing and/or search lighting effects on walls at or near joining corners of the walls, in accordance with the embodiments of the present invention.
Figure 10B:
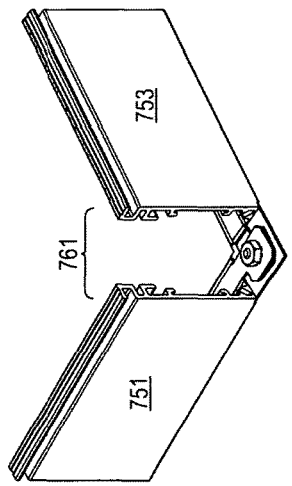
FIGS. 10A-D illustrate pivoting corner features installed on ends of joining elongated LED light fixtures along walls and through joining corners of the walls to accommodate for varying angles between the walls, in accordance with the embodiments of the invention.
Figure 10D:
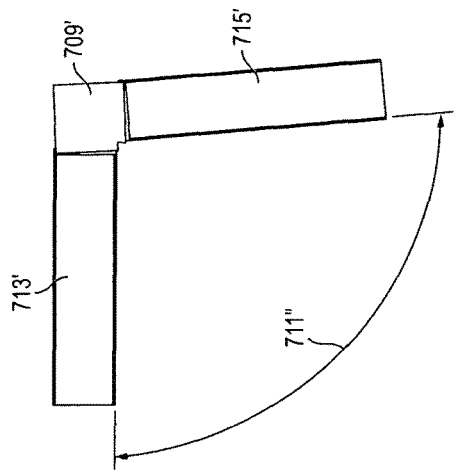
Figure 10A:
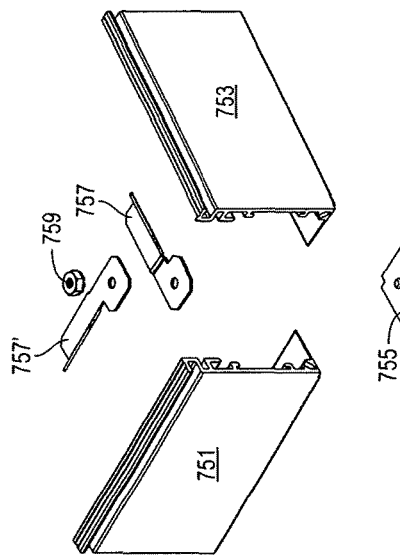
Figure 10C:
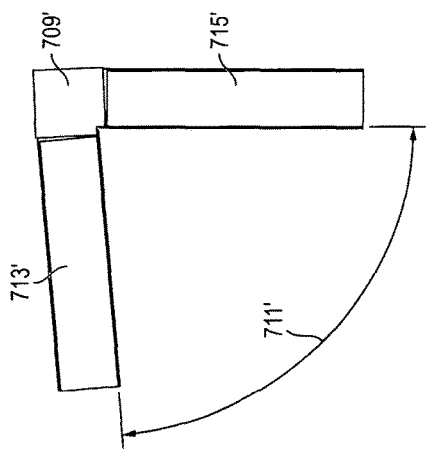

FIG. 9 shows a schematic representation of diffuser optics 721' installed on joining ends of elongated LED light fixtures to reduce or eliminate cross-over shadowing and/or search lighting effects on walls at or near joining corners of the walls. The diffuser optics 721' are preferably made from a fenestrated opaque material that has apertures 731 and 731' that are of the appropriate size and are space at an appropriate distance from one and other to reduce or eliminate cross-over shadowing and/or search lighting effects, such as described above. While the diffuser optics 721' are preferably formed from a fenestrated opaque material, such as metal, it will be clear to one skilled in the art that the diffuser optics 721' can also be formed for a fenestrated transparent or partially transparent material, such as glass or plastic.

FIGS. 10A-D illustrate pivoting corner features installed on joining ends of elongated LED light fixtures along walls and through joining corner of the walls to accommodate for varying angles θ (711; FIG. 7) between the walls. The pivoting corner features includes two joining plates sections and a pivoting region 761. The pivoting region 761 is formed with a pin member 755 and two arm sections 757 and 757' that are attached to the pin member through, for example, a bolt 759. The arm members 757 and 757' couple to the two plate sections and a cover 709' is placed over the pivoting region 761, such that the two plate sections 751 and 753 can pivot through a range of motion 711'. In operation a pivoting corner features, such described above are attached to corner ends of elongated LED light fixture 713' and 715' and the pivoting corner feature allows the elongated LED light fixtures 713' and 715' to be installed continuously and seamlessly through joining corners between wall with varying degrees of separation while still fitting firmly against the walls and through the joining corner.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A lighting system comprising elongated LED light fixtures each having;
    a) a master circuit board with connectors configured to power arrays of light emitting diodes; and
    b) a set of light boards with the arrays of light emitting diodes with matched connector configured to detachably and interchangeably couple to the connectors on the master circuit board and wherein at least one of the elongated LED light fixtures includes a telescoping end feature that allows the at least one elongated LED light fixture to be adjusted to have varying degrees of length.

2. The lighting system of claim 1, wherein the master circuit board includes a transformer.

3. The lighting system of claim 1, further comprising fenestrated diffuser optics coupled to at least one end of at least one of the elongated LED light fixtures and positioned in front of a portion of the arrays of light emitting diodes.

4. The lighting system of claim 1, further comprising a pivoting corner feature coupled to ends of at least two of the elongated LED light fixtures, such that the at least two elongated LED light fixtures can pivot through a range of angles.

5. A lighting system comprising elongated LED light fixtures each having;
    a) a master circuit board with connectors configured to power arrays of light emitting diodes; and
    b) a set of light boards with the arrays of light emitting diodes a set of light boards with the arrays of light emitting diodes with matched connector configured to detachably and interchangeably couple to the connectors on the master circuit board, the system further comprising fenestrated diffuser optics coupled to at least one end of at least one of the elongated LED light fixtures and positioned in front of a portion of the arrays of light emitting diodes.

6. The lighting system of claim 5, wherein the master circuit board includes a transformer.

7. The lighting system of claim 5, wherein at least one of the elongated LED light fixtures includes a telescoping end feature that allows the at least one of the elongated LED light fixtures to be adjusted to have varying degrees of length.

8. The lighting device of claim 5, further comprising a pivoting corner feature coupled to ends of at least two of the elongated LED light fixtures, such that the at least two elongated LED light fixtures can pivot through a range of angles.

9. A lighting system comprising elongated LED light fixtures each having;
    a) a master circuit board with connectors configured to power arrays of light emitting diodes; and
    b) a set of light boards with the arrays of light emitting diodes with matched connector configured to detachably and interchangeably couple to the connectors on the master circuit board, the system further comprising a pivoting corner feature coupled to ends of at least two of the elongated LED light fixtures, such that the at least two elongated LED light fixtures can pivot through a range of angles.

10. The lighting system of claim 9, wherein the master circuit board includes a transformer.

11. The lighting system of claim 9, further comprising fenestrated diffuser optics coupled to at least one end of at least one of the elongated LED light fixtures and positioned in front of a portion of the arrays of light emitting diodes.

12. The lighting device of claim 9, wherein at least one of the elongated LED light fixtures includes a telescoping end feature that allows the at least one elongated LED light fixture to be adjusted to have varying degrees of length.

* * * * *